(12) United States Patent
Kimberly (10) Patent No.: US 9,811,657 B2
(45) Date of Patent: Nov. 7, 2017

(54) SECURITY INFORMATION FOR SOFTWARE PARTS

(71) Applicant: The Boeing Company, Chicago, IL (US)

(72) Inventor: Gregory A. Kimberly, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/297,729

(22) Filed: Jun. 6, 2014

(65) Prior Publication Data

US 2015/0356319 A1 Dec. 10, 2015

(51) Int. Cl.
*G06F 21/51* (2013.01)
*G06F 21/64* (2013.01)

(52) U.S. Cl.
CPC .............. *G06F 21/51* (2013.01); *G06F 21/64* (2013.01)

(58) Field of Classification Search
CPC .......... G06F 21/00; G06F 21/10; G06F 21/30; G06F 21/44; G06F 21/50; G06F 21/51; G06F 21/57; G06F 21/60; G06F 21/64; G06F 21/645; H04L 63/00; H04L 63/08; H04L 63/0807; H04L 63/0823; H04L 63/12; H04L 63/123; H04L 63/126
See application file for complete search history.

(56) References Cited

U.S. PATENT DOCUMENTS

| | | | |
|---|---|---|---|
| 8,442,751 B2 | 5/2013 | Kimberly et al. | |
| 8,589,020 B1 | 11/2013 | Angus et al. | |
| 2004/0127196 A1* | 7/2004 | Dabbish et al. | 455/411 |
| 2007/0226798 A1* | 9/2007 | Sibert | G06F 21/51 |
| | | | 726/22 |
| 2009/0138385 A1* | 5/2009 | Harnish et al. | 705/28 |
| 2009/0138517 A1* | 5/2009 | McLain | G06F 17/30011 |
| 2010/0098243 A1* | 4/2010 | Chopart | G06F 21/31 |
| | | | 380/28 |
| 2010/0199280 A1* | 8/2010 | Vestal | G06F 9/4881 |
| | | | 718/102 |
| 2012/0216286 A1* | 8/2012 | Johnson | G06F 21/64 |
| | | | 726/26 |
| 2013/0159477 A1* | 6/2013 | Danielsson | G06F 9/5066 |
| | | | 709/220 |

OTHER PUBLICATIONS

Lawson, "Software Part Validation Using Hardware Cryptographic Modules and One-Time Pad Encryption," U.S. Appl. No. 13/870,741, filed Apr. 25, 2013, 66 pages.

Kimberly et al., "Use of Multiple Digital Signatures and Quorum Rules to Verify Aircraft Information," U.S. Appl. No. 13/888,730, filed May 7, 2013, 32 pages.

(Continued)

*Primary Examiner* — Jung Kim
*Assistant Examiner* — Adrian Stoica
(74) *Attorney, Agent, or Firm* — Yee & Asscoiates, P.C.

(57) ABSTRACT

A system and method of identifying a security policy for a software part. Security information for the software part is signed with a security information digital signature to form signed security information. The security information identifies a security policy for the software part. The signed security information is associated with the software part.

19 Claims, 4 Drawing Sheets

(56) References Cited

OTHER PUBLICATIONS

Kimberly "Verification of Aircraft Information in Response to Compromised Digital Certificate," U.S. Appl. No. 13/888,747, filed May 7, 2013, 33 pages.

Angus et al., "Aircraft Configuration and Software Part Management Using a Configuration Software Part," U.S. Appl. No. 14/097,982, filed Dec. 5, 2013, 62 pages.

* cited by examiner

SECURITY INFORMATION FOR SOFTWARE PARTS

BACKGROUND INFORMATION

1. Field

The present disclosure relates generally to aircraft and, in particular, to software aircraft parts. More particularly, the present disclosure relates to a method and apparatus for associating security information with software parts and using such security information to check the authenticity and integrity of software parts for an aircraft or other vehicle.

2. Background

Modern aircraft are extremely complex. For example, an aircraft may have many types of electronic systems on board. An electronic system on an aircraft may be a line-replaceable unit (LRU). A line-replaceable unit is designed to be easily replaceable.

An electronic system may take on various forms. An electronic system on an aircraft may be, for example, without limitation, a flight management system, an autopilot, an in-flight entertainment system, a communications system, a navigation system, a flight controller, a flight recorder, and a collision avoidance system. The various electronic systems on an aircraft may communicate with each other via digital airplane networks.

Electronic systems may use software or programming to provide the logic or control for various operations and functions. The software used in these electronic systems is commonly treated as parts in the airline industry. In particular, a software application for use in a line-replaceable unit on an aircraft may be tracked separately from the line-replaceable unit itself. Aircraft software that is treated as an aircraft part may be referred to as a loadable software aircraft part, an aircraft software part, or simply as a software part. A software part may be considered part of the configuration of an aircraft, rather than part of the hardware which operates the software.

Aircraft operators are entities that operate aircraft. Examples of aircraft operators include airlines and military units. Aircraft operators may be responsible for the maintenance and repair of aircraft. Maintenance and repair of an aircraft may include loading software parts on the aircraft.

Software parts are typically already installed in the electronic systems on an aircraft when an aircraft operator receives an aircraft. For example, software parts for the electronic systems may be provided by the aircraft manufacturer and installed on the aircraft by the aircraft manufacturer before the aircraft is delivered to the operator. The aircraft operator may also receive copies of these loaded software parts in case the parts need to be reinstalled or reloaded into the electronic systems on the aircraft. Reloading of software parts may be required, for example, if a line-replaceable unit in which the software is used is replaced or repaired.

An aircraft operator also may receive updates to the software parts from the aircraft manufacturer from time to time. These updates may include additional features not present in the currently-installed software parts and may be considered upgrades to one or more electronic systems. Alternatively, or in addition, these updates may include fixes to issues that may have been discovered in the currently-installed software parts. These updates also may be loaded on the aircraft by the aircraft operator.

An aircraft operator also may provide software parts for an aircraft. Operator provided software parts may be loaded on the aircraft by the aircraft manufacturer before the aircraft is delivered to the operator. Operator provided software parts also may be loaded on the aircraft by the operator after delivery. For example, operator software parts that were installed on the aircraft by the manufacturer may need to be reloaded on the aircraft in some cases. Updates to the operator software parts also may be loaded on the aircraft by the operator from time to time.

Specified procedures may be followed by the operator of an aircraft during loading of manufacturer and operator provided software parts on an aircraft so that the current configuration of the aircraft is known. The software configuration of an aircraft includes all of the software parts loaded on the aircraft.

Specified security procedures also may be followed to ensure that software parts that are loaded on an aircraft are correct and do not affect the operation of the aircraft in any undesired way. For example, it may be desirable to authenticate the source of a software part and to verify the integrity of the software part before the software part is loaded or otherwise used on the aircraft.

Accordingly, it would be beneficial to have a method and apparatus that take into account one or more of the issues discussed above, as well as possible other issues.

SUMMARY

The illustrative embodiments of the present disclosure provide a method of identifying a security policy for a software part. Security information for a software part is signed with a security information digital signature to form signed security information. The security information identifies a security policy for the software part. The signed security information is associated with the software part.

The illustrative embodiments of the present disclosure also provide an apparatus comprising a security information generator, a security information signer, and a security information associator. The security information generator is configured to generate security information for a software part. The security information identifies a security policy for the software part. The security information signer is configured to sign the security information for the software part with a security information digital signature to form signed security information. The security information associator is configured to associate the signed security information with the software part.

The illustrative embodiments of the present disclosure also provide another method of identifying a security policy for a software part. A processor unit on a vehicle receives a software part and security information for the software part. The security information identifies a security policy for the software part, is signed with a security information digital signature, and is associated with the software part. The security information digital signature is checked by the processor unit on the vehicle to determine whether the security information is correct. In response to a determination that the security information is correct, the processor unit on the vehicle uses the security information to check the software part to determine whether the software part is correct.

The features, functions, and benefits can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and benefits thereof, will best be understood by reference to the following detailed description of illustrative embodiments of the present disclosure when read in conjunction with the accompanying drawings, wherein:

DETAILED DESCRIPTION

The different illustrative embodiments recognize and take into account a number of different considerations. "A number of," as used herein with reference to items, means one or more items. For example, "a number of different considerations" are one or more different considerations.

The different illustrative embodiments recognize and take into account that currently, the authenticity and integrity of software parts for aircraft may be guaranteed by rigid procedures encoded in software systems. Such current systems may be difficult to change, for example, to reflect changing security policies for checking the authenticity and integrity of software parts for an aircraft.

The different illustrative embodiments also recognize and take into account that various different software parts for an aircraft may affect the operation of the aircraft in various different ways. Therefore, different security policies may be desirable for different software parts for an aircraft. However, current systems and methods may not provide for using different security policies for different types of software parts for an aircraft.

Therefore, the illustrative embodiments provide a flexible mechanism that allows different software parts for an aircraft or other vehicle to be handled appropriately by security policies targeted at specific software parts. In accordance with an illustrative embodiment, security information identifying the security policy for a particular software part may be associated with the software part and delivered along with the software part to an aircraft or other vehicle. The security information associated with the software part may be generated and signed by a trusted entity. The authenticity and integrity of the security information therefore may be confirmed before the security information is used to verify the authenticity and integrity of the software part.

Figure 1:
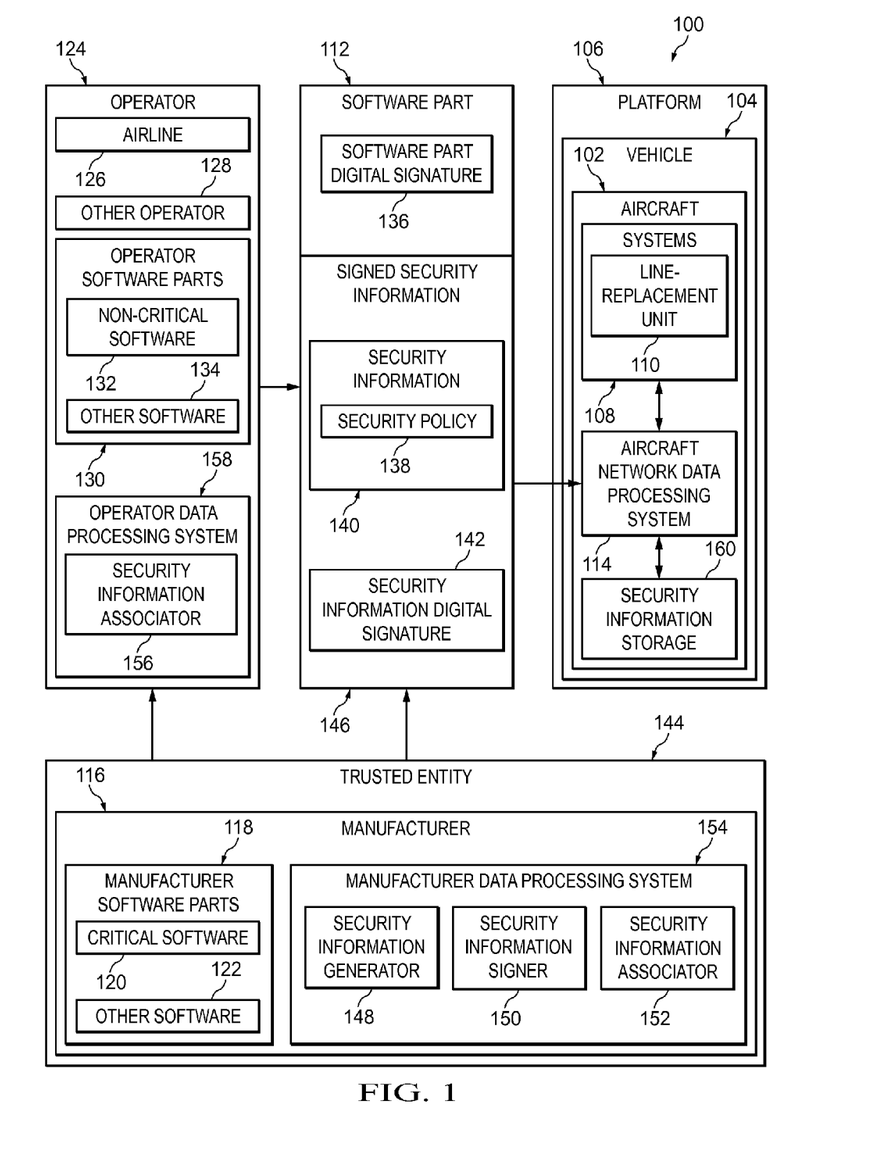
FIG. 1 is an illustration of a block diagram of a maintenance environment in accordance with an illustrative embodiment.

Turning to FIG. 1, an illustration of a block diagram of a maintenance environment is depicted in accordance with an illustrative embodiment. Maintenance environment 100 may include any appropriate environment for maintaining, for example, aircraft 102.

For example, without limitation, aircraft 102 may be a commercial passenger aircraft, a cargo aircraft, a private or personal aviation aircraft, a military aircraft, or any other appropriate type of aircraft that may be used for any appropriate purpose. Aircraft 102 may be a fixed-wing, rotary-wing, or lighter-than-air aircraft. Aircraft 102 may be a manned aircraft or an unmanned aerial vehicle.

Aircraft 102 is an example of one type of vehicle 104 for which illustrative embodiments may be implemented. Vehicle 104 may comprise any appropriate vehicle other than aircraft 102. For example, without limitation, vehicle 104 may be configured to move and to perform any appropriate operation in the air, in space, on the surface of water, under water, on the surface of the ground, under the ground, or in any other medium or combination of media.

Vehicle 104 is an example of one type of platform 106 for which illustrative embodiments may be implemented. For example, platform 106 may comprise any appropriate fixed or mobile platform.

Aircraft 102 may include various systems 108 for performing various functions on aircraft 102. For example, without limitation, systems 108 on aircraft 102 may include line-replaceable unit 110. Software part 112 may be loaded on systems 108 to implement the functions performed by systems 108 on aircraft 102.

Communications between and among systems 108 on aircraft 102 may be provided by aircraft network data processing system 114. For example, without limitation, aircraft network data processing system 114 on aircraft 102 may be configured to receive software part 112, store software part 112 on aircraft 102, load software part 112 on systems 108, and otherwise use software part 112 on aircraft 102 for any appropriate purpose.

Aircraft 102 may be made by manufacturer 116. Manufacturer 116 may provide manufacturer software parts 118 for use on aircraft 102. For example, without limitation, software part 112 for aircraft 102 may include a number of manufacturer software parts 118.

Manufacturer software parts 118 may include critical software 120, other software 122, or both. Critical software 120 may include software that is required for or otherwise may affect the safe operation of aircraft 102. For example, without limitation, critical software 120 may include software that affects the requirements for airworthiness of an aircraft as set forth in Federal Aviation Regulations, Part 25, or other rules and regulations in the United States of America and other countries. Other software 122 may include software other than critical software 120. For example, without limitation, other software 122 may include non-critical software.

Manufacturer 116 may or may not produce all of manufacturer software parts 118 provided by manufacturer 116 for use on aircraft 102. For example, a portion of manufacturer software parts 118 may be produced by a third party supplier for manufacturer 116 or otherwise obtained by manufacturer 116 from a third party supplier. In this case, manufacturer software parts 118 may include third party software parts that are provided by the third party supplier.

Aircraft 102 may be operated by operator 124. For example, operator 124 may be airline 126 or other operator 128. For example, without limitation, other operator 128 may be a military organization or any other appropriate government or private entity or any appropriate combination of entities that operates aircraft 102 for any appropriate purpose.

Operator 124 may provide operator software parts 130 for use on aircraft 102. For example, without limitation, software part 112 for aircraft 102 may include a number of operator software parts 130. Operator software parts 130 may include non-critical software 132, other software 134, or both. Non-critical software 132 may include software that is desirable for the efficient operation of aircraft 102, for the comfort of the passengers on aircraft 102, or for any other appropriate purpose or combination of purposes. However, non-critical software 132 does not affect the safe operation of aircraft 102. For example, without limitation, non-critical software 132 may include software that affects the operating requirements for an aircraft as set forth in Federal Aviation Regulations, Part 121, or in other rules and regulations in the United States of America and other countries.

Operator 124 may or may not produce all of operator software parts 130 provided by operator 124 for use on aircraft 102. For example, a portion of operator software parts 130 may be produced by a third party supplier for operator 124 or otherwise obtained by operator 124 from a third party supplier. In this case, operator software parts 130 may include third party software parts that are provided by a third party supplier.

Software part 112 for aircraft 102 may be provided by an entity other than manufacturer 116 or operator 124. For example, without limitation, software part 112 for aircraft 102 may include a number of third party software parts that are provided by a third party supplier other than manufacturer 116 or operator 124.

Software part 112 may be signed with software part digital signature 136 to identify the source of software part 112 in a known manner. For example, software part 112 may be signed with software part digital signature 136 by manufacturer 116 when software part 112 comprises manufacturer software parts 118 provided by manufacturer 116. Software part 112 may be signed with software part digital signature 136 by operator 124 when software part 112 comprises operator software parts 130 provided by operator 124.

Software part 112 may be loaded on aircraft 102 by manufacturer 116 before aircraft 102 is delivered to operator 124. Software part 112 also may be loaded on aircraft 102 after delivery to operator 124. For example, without limitation, software part 112 may be loaded on aircraft 102 to replace or update a number of software parts that were originally loaded on aircraft 102 by manufacturer 116.

Software part 112 may be loaded on aircraft 102 by operator 124 as part of the process of maintaining aircraft 102 by operator 124. Alternatively, or in addition, software part 112 may be loaded on aircraft 102 by another appropriate entity. For example, without limitation, software part 112 may be loaded on aircraft 102 by a maintenance entity or another entity that maintains aircraft 102 for operator 124.

Security policy 138 may be followed for loading software part 112 on aircraft 102. Security policy 138 may be established to ensure that operation of aircraft 102 is not affected in an undesired manner by loading or otherwise using software part 112 that is not correct on aircraft 102. For example, security policy 138 may specify how software part 112 is checked before software part 112 is loaded or otherwise used on aircraft 102. Security policy 138 may be established by manufacturer 116, by operator 124, by another entity, or by a combination of appropriate entities. For example, without limitation, security policy 138 may be configured to satisfy rules or regulations established by a government entity or other authority for the operation of aircraft 102.

Security policy 138 may specify different policies for different software parts. For example, without limitation, security policy 138 may specify that software part 112 is checked in one way before software part 112 is loaded or otherwise used on aircraft 102 when software part 112 comprises critical software 120. Security policy 138 may specify that software part 112 is checked in a different way before software part 112 is loaded or otherwise used on aircraft 102 when software part 112 comprises non-critical software 132.

In accordance with an illustrative embodiment, security policy 138 for software part 112 may be identified by security information 140 that is associated with software part 112 and that may be delivered to aircraft 102 along with software part 112. For example, security information 140 may comprise metadata that is included as a part of software part 112 that is delivered to aircraft 102. Alternatively, security information 140 may be included along with software part 112 in a crate for delivering software part 112 to aircraft 102.

Security information 140 may include part-identification information identifying software part 112 for which security information 140 is applicable. For example, without limitation, such part identification information may identify software parts in addition to software part 112 for which security information 140 is applicable.

Security information 140 also includes information identifying how software part 112 is checked or used to ensure that software part 112 is correct before software part 112 is loaded or otherwise used on aircraft 102. For example, without limitation, security information 140 may identify at least one of a number of acceptable digital certificates for software part digital signature 136 for software part 112, a number of acceptable certificate authorities for issuing the digital certificates for software part digital signature 136 for software part 112, or both. Alternatively, or in addition, security information 140 may identify systems 108 on aircraft 102 on which software part 112 is approved to be loaded or otherwise used.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Security information 140 may be signed with security information digital signature 142 to identify the source of security information 140 in a known manner. For example, security information 140 for software part 112 may be generated by trusted entity 144. In this case, security information 140 may be signed with security information digital signature 142 to identify trusted entity 144 as the source of security information 140. Security information 140 that is signed with security information digital signature 142 may be referred to as signed security information 146.

Security information generator 148 may be operated by or for trusted entity 144 to generate security information 140. For example, security information generator 148 may be configured to generate security information 140 for software part 112 based on security policy 138 for software part 112.

Security information signer 150 may be operated by or for trusted entity 144 to sign security information 140 to form signed security information 146. For example, security information signer 150 may be configured to sign security information 140 with security information digital signature 142 to identify trusted entity 144 as the source of security information 140 in a known manner.

Security information associator 152 may be operated by or for trusted entity 144 to associate signed security information 146 with software part 112 in an appropriate manner. For example, without limitation, security information associator 152 may be configured to associate signed security information 146 with software part 112 by at least one of including signed security information 146 as part of software part 112, by including signed security information 146 in a crate for delivering software part 112 to vehicle 104, or both.

Trusted entity 144 may be any appropriate entity. For example, without limitation, trusted entity 144 may be manufacturer 116 of aircraft 102. In this case, for example, security information generator 148, security information signer 150, and security information associator 152 may be implemented in hardware or in hardware in combination with software in manufacturer data processing system 154. Manufacturer data processing system 154 may include any appropriate data processing system operated by or for manufacturer 116 of aircraft 102.

Software part 112 and associated signed security information 146 for software part 112 may be delivered together to vehicle 104 in an appropriate manner by trusted entity 144 or by another appropriate entity. For example, without limitation, software part 112 and associated signed security information 146 for aircraft 102 may be delivered together to aircraft 102 in an appropriate manner by manufacturer 116 of aircraft 102, by operator 124 of aircraft 102, or by another appropriate entity. Manufacturer 116 of aircraft 102 may deliver or otherwise provide software part 112 and associated signed security information 146 for software part 112 together to operator 124 of aircraft 102 or another appropriate entity for delivery to aircraft 102 in any appropriate manner.

Software part 112 may be provided by or to trusted entity 144 so that trusted entity 144 may associate signed security information 146 generated by trusted entity 144 with software part 112. For example, when software part 112 for aircraft 102 comprises operator software parts 130 provided by operator 124 of aircraft 102, operator software parts 130 may be provided from operator 124 to manufacturer 116 of aircraft 102 so that manufacturer 116 may associate signed security information 146 generated by manufacturer 116 for operator software parts 130 with software part 112 comprising operator software parts 130.

Alternatively, or in addition, the processes of generating and signing security information 140 for software part 112 and the process of associating signed security information 146 with software part 112 may be performed by different entities. In this case, trusted entity 144 may generate and sign security information 140 for software part 112 to form signed security information 146 for software part 112. Signed security information 146 for software part 112 then may be provided from trusted entity 144 to another appropriate entity. The other entity then may associate signed security information 146 provided by trusted entity 144 with software part 112 in an appropriate manner. Software part 112 and associated signed security information 146 then may be delivered together to vehicle 104 in an appropriate manner by the entity other than trusted entity 144.

For example, manufacturer 116 of aircraft 102, acting as trusted entity 144, may generate and sign security information 140 for operator software parts 130 to form signed security information 146 for operator software parts 130. For example, without limitation, manufacturer 116 may generate and sign security information 140 for part numbers or ranges of part numbers that may be reserved for use by operator 124 or another entity to assign to operator software parts 130. Signed security information 146 for operator software parts 130 then may be provided from manufacturer 116 to operator 124 of aircraft 102 in any appropriate manner.

Operator 124 may associate signed security information 146 provided by manufacturer 116 with the appropriate operator software parts 130 in an appropriate manner. For example, security information associator 156 may be operated by or for operator 124 of aircraft 102. Security information associator 156 may be configured to associate signed security information 146 provided by manufacturer 116 with operator software parts 130 in an appropriate manner. For example, without limitation, security information associator 156 may be implemented in hardware or in hardware in combination with software in operator data processing system 158. Operator data processing system 158 may include any appropriate data processing system operated by or for operator 124 of aircraft 102. Operator software parts 130 and associated signed security information 146 then may be delivered together to aircraft 102 in an appropriate manner by operator 124 of aircraft 102.

Any appropriate method and apparatus may be used by operator 124 of aircraft 102 or another appropriate entity to deliver software part 112 and associated signed security information 146 for software part 112 together to aircraft 102. For example, a human technician may use a maintenance device to deliver software part 112 and associated signed security information 146 together to aircraft 102. For example, without limitation, the maintenance device may be a laptop computer or another appropriate portable data processing device. Software part 112 and associated signed security information 146 for software part 112 may be stored together on the maintenance device by aircraft operator 124 or another appropriate entity and the maintenance device then may be moved to aircraft 102. A human technician may connect the maintenance device to aircraft network data processing system 114 on aircraft 102 via an appropriate wired or wireless connection. Software part 112 and associated signed security information 146 then may be delivered together to aircraft 102 by copying or otherwise moving software part 112 and associated signed security information 146 for software part 112 together from the maintenance device to aircraft network data processing system 114 on aircraft 102.

Alternatively, or in addition, software part 112 and associated signed security information 146 for software part 112 may be delivered together to aircraft 102 without physically transporting software part 112 and associated signed security information 146 to aircraft 102 on a maintenance device. For example, without limitation, software part 112 and associated signed security information 146 for software part 112 may be delivered together to aircraft 102 via an appropriate wired or wireless connection between operator data processing system 158 and aircraft network data processing system 114 on aircraft 102.

Aircraft network data processing system 114 may be configured to receive software part 112 and associated signed security information 146 for software part 112 in any appropriate manner. Aircraft network data processing system 114 also may be configured to check security information digital signature 142 to determine whether security information 140 associated with software part 112 is correct. For example, without limitation, aircraft network data processing system 114 may be configured to use security information digital signature 142 in a known manner to authenticate the source of security information 140 as trusted entity 144. Aircraft network data processing system 114 also may be configured to use security information digital signature 142 in a known manner to determine whether security information 140 has changed since security information 140 was signed by trusted entity 144 with security information digital signature 142.

Aircraft network data processing system 114 may be configured to use security information 140 to check or use software part 112 on aircraft 102 when security information 140 associated with software part 112 is determined to be correct. For example, aircraft network data processing system 114 may be configured to use security information 140 for software part 112 to determine how software part digital signature 136 for software part 112 is checked or otherwise used by aircraft network data processing system 114 to determine whether software part 112 is correct before software part 112 is loaded or otherwise used on aircraft 102. For example, without limitation, aircraft network data processing system 114 may use security information 140 identifying a number of acceptable digital certificates for software part digital signature 136, security information 140 identifying a number of acceptable certificate authorities for issuing the digital certificates for software part digital signature 136, or both, to check software part digital signature 136 for software part 112.

For example, without limitation, aircraft network data processing system 114 may be configured to use security information 140 for software part 112 to check software part digital signature 136 in a known manner to authenticate the source of software part 112. Aircraft network data processing system 114 also may be configured to use security information 140 for software part 112 to check software part digital signature 136 in a known manner to determine whether software part 112 has changed since software part 112 was signed with software part digital signature 136.

Aircraft network data processing system 114 may be configured to use software part 112 on aircraft 102 when software part 112 is determined to be correct. For example, without limitation, aircraft network data processing system 114 may be configured to load software part 112 on appropriate systems 108 on aircraft 102 when software part 112 is determined to be correct. Aircraft network data processing system 114 may be configured to use security information 140 for software part 112 to determine how software part 112 is used on aircraft 102. For example, without limitation, aircraft network data processing system 114 may use security information 140 identifying systems 108 on aircraft 102 on which software part 112 is approved to be loaded to ensure that software part 112 is loaded only on appropriate ones of systems 108 on aircraft 102.

Aircraft network data processing system 114 may be configured to store security information 140 for software part 112 in security information storage 160 on aircraft 102 when security information 140 associated with software part 112 is determined to be correct. Security information storage 160 may be implemented using any appropriate device and method for storing data on aircraft 102. Security information 140 may be stored in security information storage 160 on aircraft 102 in any appropriate manner and form. For example, without limitation, security information 140 stored in security information storage 160 on aircraft 102 may be used to re-check software part 112 on aircraft 102 in any appropriate manner at any appropriate time after software part 112 is delivered to aircraft 102.

The illustration of FIG. 1 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined, divided, or combined and divided into different blocks when implemented in different illustrative embodiments.

For example, preferably, only a single trusted entity 144 may be authorized to sign security information 140 for software part 112 for a particular aircraft 102 or other vehicle 104. In this case, aircraft 102 or other vehicle 104 will determine that security information 140 for software part 112 is not correct unless security information digital signature 142 indicates that security information 140 for software part 112 is from trusted entity 144. Alternatively, more than one trusted entity 144 may be authorized to sign security information 140 for software part 112 for a particular aircraft 102 or other vehicle 104. In this case, aircraft 102 or other vehicle 104 may determine that security information 140 for software part 112 is correct when security information digital signature 142 indicates that security information 140 for software part 112 is from any one of a plurality of trusted entities.

Figure 2:
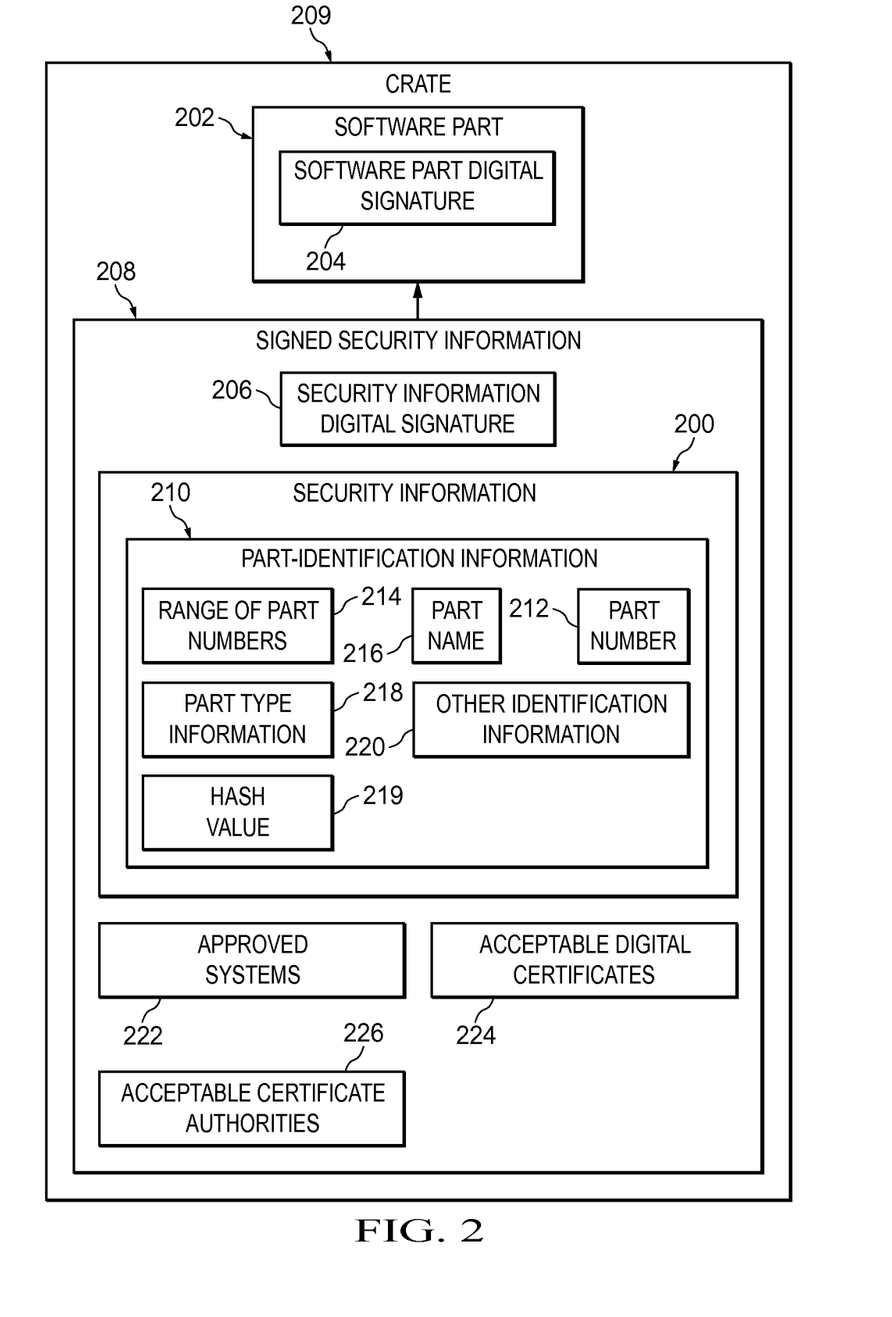
FIG. 2 is an illustration of a block diagram of security information for a software part in accordance with an illustrative embodiment.

Turning to FIG. 2, an illustration of a block diagram of security information for a software part is depicted in accordance with an illustrative embodiment. Security information 200 may be an example of one implementation of security information 140 for software part 112 in FIG. 1.

Security information 200 for software part 202 may include part-identification information 210. Part-identification information 210 may include any appropriate information identifying software part 202 for which security information 200 is applicable. For example, without limitation, part-identification information 210 may include part number 212, range of part numbers 214, part name 216, part type information 218, hash value 219 for software part 202, other identification information 220, or various combinations of information identifying software part 202 for which security information 200 is applicable.

Part number 212 may comprise any appropriate combination of numbers, letters, or both numbers and letters that may be assigned to identify software part 202. Range of part numbers 214 may include a plurality of part numbers that includes part number 212 for software part 202. Range of part numbers 214 also may include part numbers for software parts other than software part 202 to which security information 200 applies. Part name 216 may include any appropriate name that may be assigned to identify software part 202. Part type information 218 may include any appropriate information for identifying a type of software part 202. Part type information 218 may identify software parts other than software part 202, that are the same type of software part as software part 202, to which security information 200 for software part 202 applies. Hash value 219 for software part 202 may be determined in a known manner using any appropriate hash function. For example, without limitation, the SHA-256 cryptographic hash function or another appropriate cryptographic hash function may be used to generate hash value 219 for software part 202. Other identification information 220 may include any other appropriate information identifying software part 202 or software parts in addition to software part 202 to which security information 200 applies.

Security information 200 for software part 202 also includes information identifying how software part 202 is checked or used to ensure that software part 202 is correct before software part 202 is loaded or otherwise used on an aircraft or other vehicle. For example, without limitation, security information 200 for software part 202 may identify approved systems 222 on an aircraft or other vehicle on which software part 202 is approved to be loaded or otherwise used.

Software part 202 may be signed with software part digital signature 204 to identify the source of software part 202 in a known manner. In this case, security information 200 for software part 202 may identify a number of acceptable digital certificates 224 for software part digital signature 204. Alternatively, or in addition, security information 200 for software part 202 may identify a number of acceptable certificate authorities 226 for issuing the digital certificates for software part digital signature 204.

Security information 200 may be signed with security information digital signature 206 to identify the source of security information 200 in a known manner. Security information 200 that is signed with security information digital signature 206 may be referred to as signed security information 208.

Signed security information 208 may be associated with software part 202 in an appropriate manner. For example, without limitation, signed security information 208 may be associated with software part 202 by including signed security information 208 as part of software part 202. Alternatively, signed security information 208 may be associated with software part 202 by including signed security information 208 along with software part 202 in crate 209 for delivering software part 202 to an aircraft or other vehicle. In this case, crate 209 refers to information that is associated with software part 202 to facilitate the delivery of software part 202 to an aircraft or other vehicle.

Figure 3:
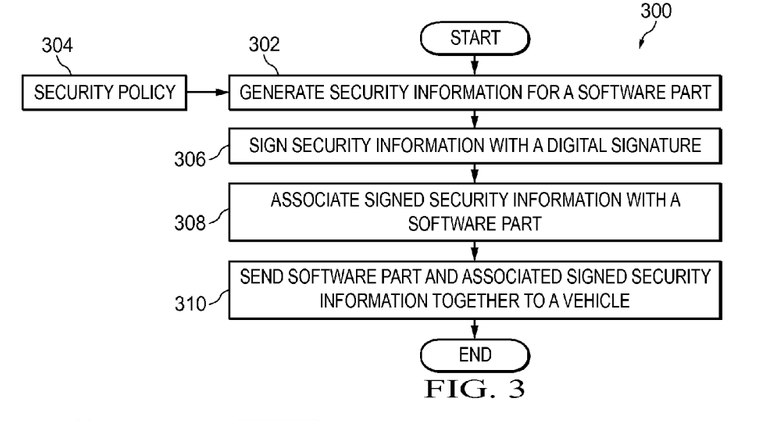
FIG. 3 is an illustration of a flowchart of a process for identifying security information for a software part in accordance with an illustrative embodiment.

Turning to FIG. 3, an illustration of a flowchart of a process for identifying security information for a software part is depicted in accordance with an illustrative embodiment. For example, without limitation, process 300 may be implemented in manufacturer data processing system 154 in FIG. 1.

Process 300 may begin with generating security information for a software part (operation 302). Security information for a software part may be generated to identify security policy 304 for the software part. Security policy 304 may specify how a software part is checked before the software part is loaded or otherwise used on an aircraft or other vehicle. Security information generated in operation 302 may include part-identification information identifying the software part for which the security information applies and information identifying how the software part is checked or used to ensure that the software part is correct before the software part is loaded or otherwise used on an aircraft or other vehicle.

The security information generated in operation 302 may be signed with a digital signature (operation 306). For example, the security information may be signed with a digital signature by a trusted entity to identify the trusted entity as the source of the security information.

The signed security information then may be associated with a software part (operation 308). The signed security information may be associated with the software part in any appropriate manner. For example, without limitation, the signed security information may be associated with the software part by including the signed security information as part of the software part, by including the signed security information along with the software part in a crate for delivering the software part to an aircraft or other vehicle, or both. Associating the signed security information with the software part in operation 308 may be performed by the same entity that generated the security information in operation 302 and that signed the security information in operation 306 or by a different entity.

The software part and associated signed security information for the software part then may be sent together to a vehicle (operation 310), with the process terminating thereafter. For example, operation 310 may include delivering the software part and associated signed security information to an aircraft or other vehicle in any appropriate manner. The software part and associated signed security information may be sent directly to the aircraft or other vehicle by the entity that associated the signed security information with the software part in operation 308. Alternatively, operation 310 may include sending the software part and associated signed security information for the software part to the aircraft or other vehicle indirectly via a number of appropriate intermediate entities.

Figure 4:
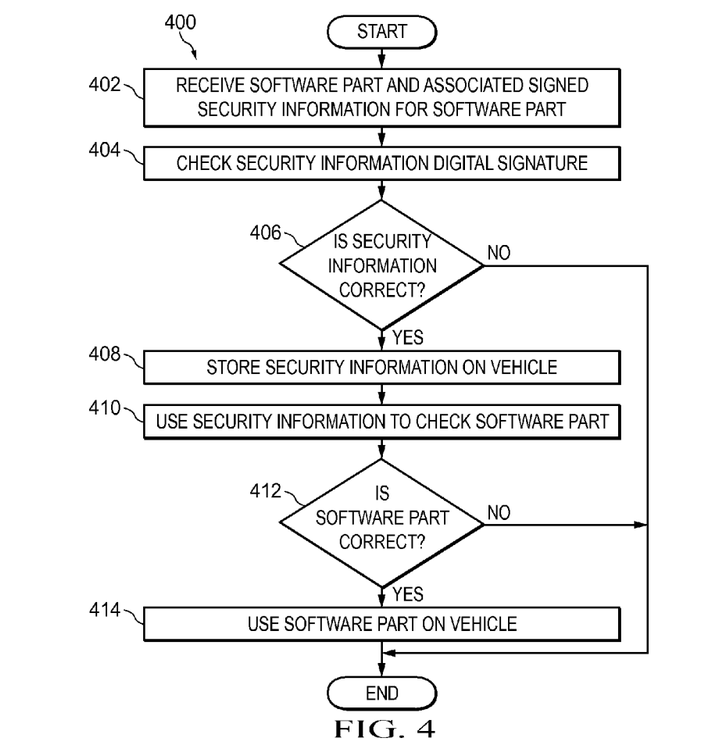
FIG. 4 is an illustration of a flowchart of a process for using security information for a software part in accordance with an illustrative embodiment.

Turning to FIG. 4, an illustration of a flowchart of a process for using security information for a software part is depicted in accordance with an illustrative embodiment. For example, without limitation, process 400 may be implemented in aircraft network data processing system 114 in FIG. 1.

Process 400 may begin with receiving a software part and associated signed security information for the software part (operation 402). For example, the software part and associated signed security information may be received by an aircraft or other vehicle in any appropriate manner.

A security information digital signature for the security information then may be checked (operation 404) to determine whether the security information is correct (operation 406). For example, the security information digital signature may be checked in a known manner to authenticate the source of the security information as a trusted entity and to confirm that the security information has not changed since the security information was signed. The process may terminate in response to a determination at operation 406 that the security information is not correct. In this case, neither the security information nor the associated software part may be used.

When the security information is determined to be correct at operation 406, the security information may be stored on the vehicle (operation 408). For example, the security information may be stored in any appropriate manner and form in a security information store on an aircraft or other vehicle. For example, without limitation, security information stored on the aircraft or other vehicle may be used to re-check software parts on the aircraft or other vehicle in any appropriate manner at any appropriate time after the software parts are delivered to the aircraft or other vehicle.

The security information then may be used to check the software part (operation 410) to determine whether the software part is correct (operation 412). For example, the security information may be used to determine how a software part digital signature for the software part is checked or otherwise used to determine whether the software part is correct. The software part digital signature may be checked in a known manner to authenticate the source of the software part and to confirm that the software part has not changed since the software part was signed. The software part may be determined not to be correct if the source of the software part is not authenticated or it is determined that the software part has changed.

For example, without limitation, the security information may identify a number of acceptable digital certificates for the software part digital signature. In this case, the software part may be determined not to be correct when the software part digital signature does not use one of the acceptable digital certificates identified in the security information. Alternatively, or additionally, the security information may identify a number of acceptable certificate authorities for issuing the digital certificates for the software part digital signature. In this case, the software part may be determined not to be correct when the software part digital signature does not use a digital certificate issued by one of the acceptable certificate authorities identified in the security information.

The process may terminate in response to a determination at operation 412 that the software part is not correct. In this case, the software part may not be used. When the software part is determined to be correct, the software part may be used on a vehicle (operation 414), with the process terminating thereafter. For example, without limitation, operation 414 may include loading the software part on appropriate systems on an aircraft or other vehicle or using the software part on the aircraft or other vehicle in another appropriate manner or in a combination of appropriate ways.

The security information for the software part may be used to determine how the software part is used on the aircraft or other vehicle at operation 414. For example, without limitation, the security information may identify systems on an aircraft or other vehicle on which the software part is approved to be loaded. In this case, operation 414 may include ensuring that the software part is loaded only on systems that are identified as approved systems in the security information for the software part.

Figure 5:
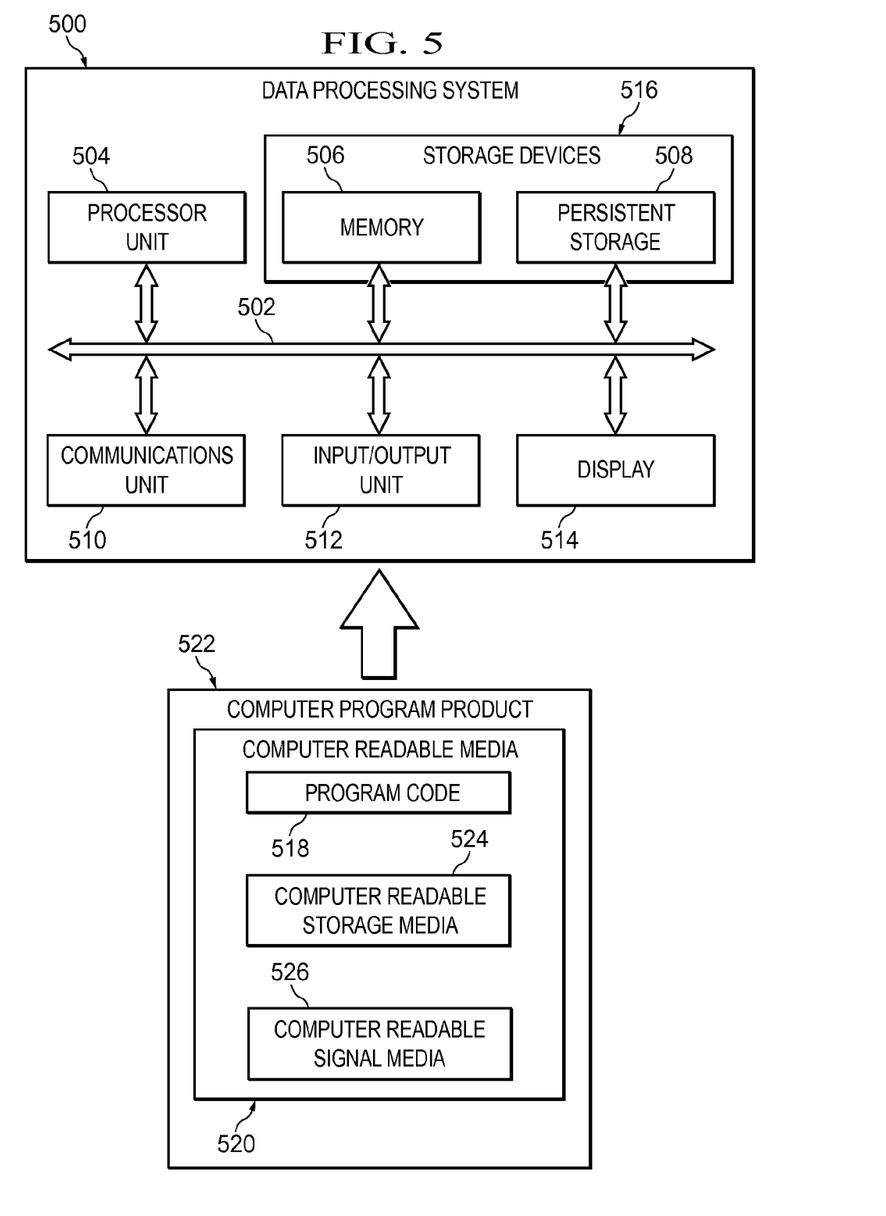
FIG. 5 is an illustration of block diagram of a data processing system in accordance with an illustrative embodiment.

Turning to FIG. 5, an illustration of a block diagram of a data processing system is depicted in accordance with an illustrative embodiment. Data processing system 500 may be an example of one implementation of one or more of aircraft network data processing system 114 on aircraft 102, manufacturer data processing system 154 operated by or for manufacturer 116 of aircraft 102, and operator data processing system 158 operated by or for operator 124 of aircraft 102 in FIG. 1.

In this illustrative example, data processing system 500 includes communications fabric 502. Communications fabric 502 provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer-implemented instructions, which may be located in a memory, such as memory 506.

These instructions are referred to as program instructions, program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526.

Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500. In some instances, computer readable storage media 524 may not be removable from data processing system 500.

In these examples, computer readable storage media 524 is a physical or tangible storage device used to store program code 518 rather than a medium that propagates or transmits program code 518. Computer readable storage media 524 is also referred to as a computer readable tangible storage device or a computer readable physical storage device. In other words, computer readable storage media 524 is a media that can be touched by a person.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 518 may be omitted, because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system.

Additionally, communications unit 510 may include a number of devices that transmit data, receive data, or transmit and receive data. Communications unit 510 may be, for example, a modem or a network adapter, two network adapters, or some combination thereof. Further, a memory may be, for example, memory 506, or a cache, such as found in an interface and memory controller hub that may be present in communications fabric 502.

The flowcharts and block diagrams in the different depicted embodiments illustrate the architecture, functionality, and operation of some possible implementations of apparatuses and methods in illustrative embodiments. In this regard, each block in the flowcharts or block diagrams may represent a module, segment, function, and/or a portion of an operation or step. For example, one or more of the blocks may be implemented as program code, in hardware, or a combination of program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order shown in the figures. For example, in some cases, two blocks shown in succession may be executed substantially concurrently, or the blocks may sometimes be performed in the reverse order, depending upon the functionality involved. Also, other blocks may be added in addition to the blocks illustrated in a flowchart or block diagram.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of identifying a software part, comprising:
   signing security information for the software part with a security information digital signature to form signed security information, wherein the security information identifies a security policy for the software part that specifies how the software part is checked based on whether the software part is critical or non-critical;
   signing the software part with a software part digital signature;
   checking the software part digital signature using the signed security information, wherein the signed security information includes information that indicates how the software part digital signature is checked to determine whether the software part is correct, such that the security information identifies an acceptable digital signature for the software part digital signature, an acceptable certificate authority, and an approved system on which the software part is approved to be used; and in response to a determination that the software part digital signature is correct, associating the signed security information with the software part such that the software part includes the signed security information.

2. The method of claim 1, wherein the security information comprises part-identification information identifying the software part to which the security policy applies, selected from:
a part number for the software part;
a range of part numbers, wherein the part number for the software part is within the range of part numbers;
a part name for the software part;
a hash value for the software part; and
part type information identifying a type of the software part.

3. The method of claim 1, wherein the security information identifies approved systems on which the software part is approved to be loaded.

4. The method of claim 1, wherein the security information identifies at least one of:
a number of acceptable digital certificates for the software part digital signature; and
a number of acceptable certificate authorities for issuing digital certificates for the software part digital signature.

5. The method of claim 1, wherein associating the signed security information with the software part is selected from:
including the signed security information as part of the software part; and
including the signed security information in a crate for delivering the software part to a vehicle.

6. The method of claim 1, wherein the software part is for a line-replaceable unit on an aircraft and further comprising sending the signed security information and the software part together to the aircraft.

7. The method of claim 1, wherein:
the security information identifies approved systems on which the software part is approved to be loaded;
the security information identifies at least one of:
a number of acceptable digital certificates for the software part digital signature; and
a number of acceptable certificate authorities for issuing digital certificates for the software part digital signature;
the software part includes the signed security information as part of the software part; and
the software part is for a line-replaceable unit on an aircraft;
the method further comprising sending the signed security information and the software part together to the aircraft.

8. An apparatus, comprising:
a security information generator configured to generate security information for a software part, wherein the security information identifies a security policy for the software part, wherein the security policy specifies how the software part is checked based on whether the software part is critical or non-critical, and the signed security information indicates how a software part digital signature is checked to determine whether the software part is correct, such that the signed security information identifies an acceptable digital signature for the software part digital signature, an acceptable certification authority, and an approved system on which the software part is approved to be used;
a security information signer configured to:
sign the security information for the software part with a security information digital signature to form the signed security information;
sign the software part with the software part digital signature; and
a security information associator configured to:
check the software part digital signature using the signed security information; and
associate the signed security information with the software part in response to a determination that the software part is correct such that the software part includes the signed security information.

9. The apparatus of claim 8, wherein the security information comprises part-identification information identifying the software part to which the security policy applies, selected from:
a part number for the software part;
a range of part numbers, wherein the part number for the software part is within the range of part numbers;
a part name for the software part;
a hash value for the software part; and
part type information identifying a type of the software part.

10. The apparatus of claim 8, wherein the security information identifies approved systems on which the software part is approved to be loaded.

11. The apparatus of claim 8, wherein the security information identifies at least one of:
a number of acceptable digital certificates for the software part digital signature; and
a number of acceptable certificate authorities for issuing digital certificates for the software part digital signature.

12. The apparatus of claim 8, wherein the security information associator is configured to at least one of:
include the signed security information as part of the software part; and
include the signed security information in a crate for delivering the software part to a vehicle.

13. The apparatus of claim 8, wherein the software part is for a line-replaceable unit on an aircraft.

14. A method of identifying a security policy for a software part, comprising:
receiving, by a processor unit on a vehicle, the software part and security information for the software part, wherein the security information identifies the security policy for the software part, is signed with a security information digital signature, and is associated with the software part, wherein the security policy specifies how the software part is checked based on whether the software part is critical or non-critical, and wherein the software part is signed with a software part digital signature that is included with the software part;
checking the security information digital signature, by the processor unit on the vehicle, to determine whether the security information is correct based on the security information, such that the security information identifies an acceptable digital signature for the software part digital signature, an acceptable certificate authority, and an approved system on which the software part is approved to be used; and
in response to a determination that the security information is correct, using the signed security information to check the software part, by the processor unit on the vehicle, to determine whether the software part is correct.

15. The method of claim 14 further comprising:
storing the security information for the software part on the vehicle in response to the determination that the security information is correct.

16. The method of claim 14, wherein the security information comprises part identification information identifying the software part to which the security policy applies, selected from:
a part number for the software part;
a range of part numbers, wherein the part number for the software part is within the range of part numbers;
a part name for the software part;
a hash value for the software part; and
part type information identifying a type of the software part.

17. The method of claim 14, wherein the security information identifies approved systems on the vehicle on which the software part is approved to be loaded and further comprising loading the software part on the approved systems in response to a determination that the software part is correct.

18. The method of claim 14, wherein:
the software part is signed with the software part digital signature for the software part; and
the security information identifies at least one of:
a number of acceptable digital certificates for the software part digital signature, and
a number of acceptable certificate authorities for issuing digital certificates for the software part digital signature.

19. The method of claim 14, wherein the vehicle is an aircraft and the software part is for a line-replaceable unit on the aircraft.

* * * * *